Figure 1:
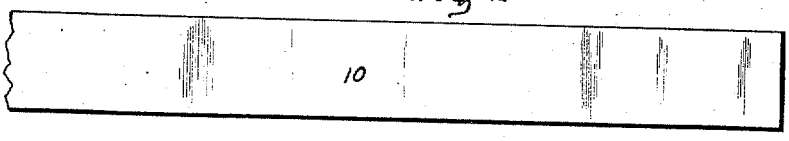

Oct. 23, 1928. W. W. BROWN Re. 17,108

METHOD OF MAKING CONTACT TIPS

Original Filed Jan. 13, 1926

Inventor:
Walter W. Brown,
by Alexander S. Lunt,
His Attorney.

Reissued Oct. 23, 1928.

Re. 17,108

UNITED STATES PATENT OFFICE.

WALTER W. BROWN, OF ERIE, PENNSYLVANIA, ASSIGNOR TO GENERAL ELECTRIC COMPANY, A CORPORATION OF NEW YORK.

METHOD OF MAKING CONTACT TIPS.

Original No. 1,672,706, dated June 5, 1928, Serial No. 81,130, filed January 13, 1926. Application for reissue filed September 10, 1928. Serial No. 305,084.

The present invention provides an improved form of contact tip suitable for use on the contact fingers of drum controllers or other switch mechanism for making and breaking electric circuits, as well as an improved method of manufacturing the contact tips or similar articles from copper or other relatively non-plastic material.

Heretofore copper contact tips of the above character ordinarily have been cast or machined to the desired shape or hot drop forged in suitable dies. The cast or machined contact tips not only are relatively expensive to produce but are very likely to have a coarse grain and also a rough and uneven contact surface, while the hot drop forged tips must first be annealed, then trimmed to remove the flash, and pickled to remove the scale. Where the contact tip is provided with a rivet or pin for attachment to a switch member, the rivet, when formed integral with the cast or machined copper contact or the hot forged copper contact is often too hard for satisfactory working.

The present invention makes it possible to produce a copper contact finger tip free from the deficiencies noted above and at the same time greatly simplifies the manufacture and reduces the cost of the tips. Briefly, this is accomplished by cold forming the contact tips to substantially the desired shape out of bar stock copper, piercing a cavity in the body of the tip and then inserting a soft copper headed rivet into the cavity and cold die pressing the contact tip and rivet into the final shape. The preliminary shaping of the tip is produced without the aid of closed dies by forcing a tool at spaced intervals into the bar stock having the proper initial dimensions. The forming tools are so shaped that the metal stock, practically unrestrained, inherently flows into substantially the desired shape. Thus, the final die pressing of the contact tip and the soft copper rivet into the finished product requires only a very limited flow of metal.

In the main pressing operation the contact surface of the tip is materially hardened while the final die pressing smooths the contact surface without hardening the projecting shank of the rivet. Consequently, the completed contact tip is very easily riveted to a supporting spring or switch member and has a contact surface that remains smooth and successfully withstands severe wear and arcing service. Other advantageous features of both the improved contact tip and the method of manufacture will appear in the course of the following specification, in which I have described the invention embodied in a preferred form for the purpose of illustration.

Figure 2:
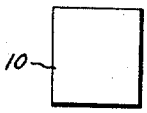

The invention may be better understood from the accompanying drawing which illustrates the several stages of manufacture of my improved contact tips from the bar stock to the finished contact tip, as well as the working tools employed in the process of manufacture. Figs. 1 and 2 show the bar stock from which the contact tips are to be formed; Figs. 3, 4, 5, 6, 7, and 8 illustrate the successive stages of the cold pressing operation without the aid of closed dies; Fig. 9 illustrates the final cold die pressing operation; and Fig. 10 is a perspective view of the finished contact tip.

As shown in Figs. 1 and 2, the bar stock 10 from which the contact tips are to be formed is of rectangular cross section and of any suitable length. The initial cross sectional dimensions of the stock are dependent upon the size of the finished product and are such that as the stock is subjected to the successive cold pressing operations the metal inherently flows into approximately the shape of the finished article.

Figure 3:
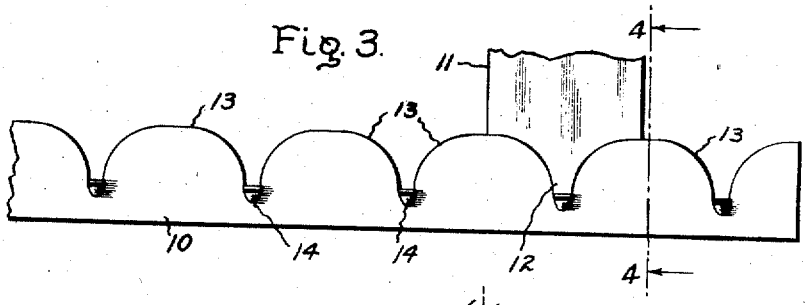
Figure 4:
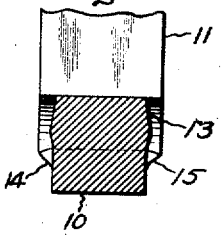

The first step in cold pressing the contact tip, as illustrated in Figs. 3 and 4, consists in forcing a wedge shaped forming tool 11 into the bar 10 at successive intervals. Preferably, the entering edge 12 of the tool is blunt so as to avoid checking or cracking the bar stock. The diverging sides of the tool are suitably formed so that the metal inherently flows into substantially the desired contour of the contact tips as the tool is successively pressed into the bar stock at properly spaced intervals.

It will be observed that the tool 11 forms the opposite halves of two adjacent contact tips at each insertion into the bar 10. In this way the lateral pressure reactions upon the tool 11 are substantially balanced. Furthermore, by permitting the metal to flow freely without restraint by closed dies, the maximum displacement is obtained with a minimum of pressure applied to the forming tool 11.

To facilitate handling during the succeeding manufacturing operations, the blunt end of the wedge shaped tool 11 is not advanced sufficiently to sever the partially formed contact tips 13 from the bar stock 10. This leaves a plurality of the partially formed tips rigidly interconnected in a strip as shown in Fig. 3. The lateral displacement of the metal in the bar is illustrated in the cross sectional view shown in Fig. 4. The opposing lips or shoulders 14 and 15 are forced out from the metal interconnecting the adjacent partially formed contacts 13. The lips are useful in obtaining proper spacing of the contacts during the successive operations thereof.

Figure 5:
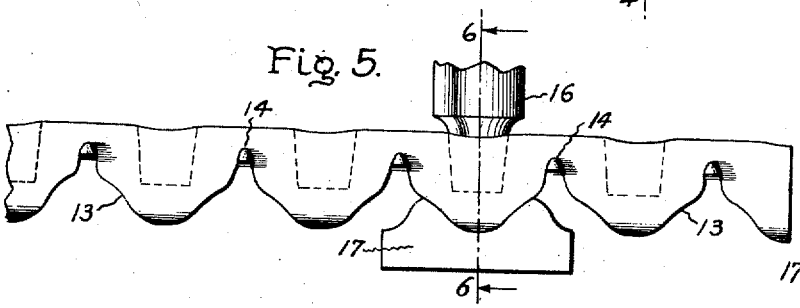
Figure 6:
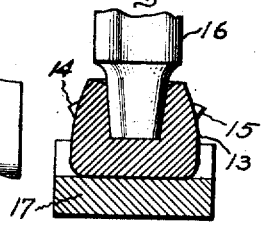

In the next cold pressing operation shown in Figs. 5 and 6 a punch 16 is inserted in the opposite side of the connected strip or partially formed tips 13 at the central portion of each of the contacts. This produces a cavity in the reverse side of the contacts and also more fully forms the contour of the contact surface of each tip in the open die 17. The metal of the tip flows into substantially the cross sectional shape shown in Fig. 6 so as to more closely approach the form of the finished contact finger in Fig. 10.

Figure 7:
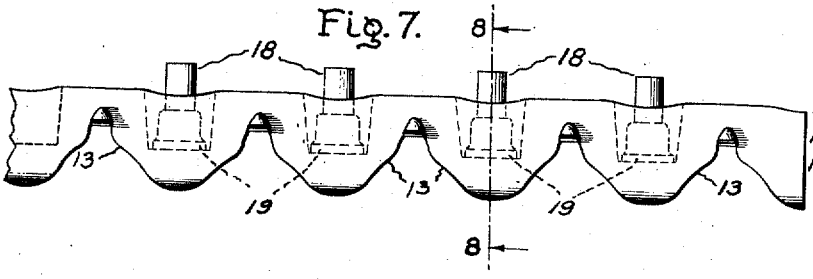
Figure 8:
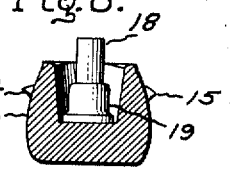
Figure 9:
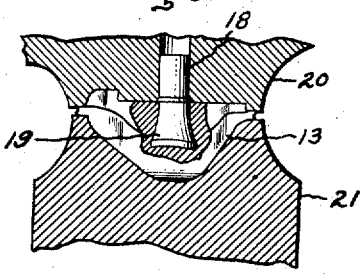
Figure 10:
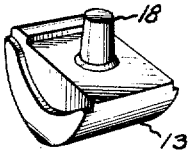

In the next step, as indicated in Figs. 7 and 8, the rivets 18 are inserted in the cylindrical recesses formed in the tip bodies and the partially completed contacts then are placed in a die press as shown in Fig. 9. Each of the rivets is provided with an enlarged head 19. As the pressure is applied the dies 20 and 21 form the contact tips into the shape shown in Fig. 10 and at the same time compress the metal in the body of the tip about the head of the soft metal rivet. The head 19 of the rivet may change its shape, but it is always embedded and held securely in the inwardly diverging conical cavity in the contact tip body, resulting from the pressure of the forming operation. In this way the head of the rivet is firmly inclasped by the solid metal walls of the cavity in the contact tip body as shown in section in Fig. 9.

The die press illustrated in Fig. 9 may be arranged to sever the contact tips, although preferably this is done in a separate operation. With a simple trimming operation to remove the burs from the connected ends of the contacts, the finished article shown in Fig. 10 is produced. Since substantially all of the metal in the original bar stock remains in the finished products, there is practically no metal wasted in my improved cold pressing process.

It will be evident that the several cold pressing operations serve to materially harden the surface of the contacts. This is a desirable feature as the contacts are better able to resist mechanical wear or electric arcing. The shanks of the rivets 18 receive no working in the die pressing operation of Fig. 9, and consequently, remain soft. This makes it easy to properly expand the rivets when the contact tip is riveted to a finger, spring or switch member.

While I have illustrated and described the improved cold pressing process applied to the production of my improved form of contact tip, it will be understood that the process is equally advantageous in the production of other articles.

It will also be understood that as to the broader features of the process it possseses advantages where the fastening member for the contact tip takes some form other than a rivet which is intended to be headed over.

What I claim as new and desire to secure by Letters Patent of the United States, is:

1. The process of making contact tips out of cold copper stock which consists in forcing a forming tool at spaced intervals into a copper bar of predetermined dimensions to flow the metal into the shape of a plurality of partially formed interconnected contact tips, then punching a cavity in the reverse side of each of said tips and inserting a fastening member therein, separately pressing the said tips about the inserted end of the fastening member associated therewith and finally severing the contact tips.

2. The process of making contact tips out of cold metal stock which comprises forcing a wedging tool into a bar of the stock to flow the metal of the stock into a plurality of partially formed contact tip bodies, then punching a cavity in each of said bodies while shaping the contact surface of the body with an open forming tool, and then inserting a relatively soft metal rivet in said cavity with the shank of the rivet projecting from the body of the tip and pressing the body of the tip about the portion of the rivet within the body while completing the shaping of the contact surface of the tip so as to leave the metal of the shank of the rivet in a relatively soft condition and the metal of the contact surface of the tip in a relatively hard condition.

3. The process of making contact tips out of cold metal stock which comprises forcing a wedge shaped forming tool into a bar of the stock to flow the metal of the stock into a plurality of interconnected partially formed contact tip bodies, then punching a cavity in the side of each of said bodies opposite the contact surface thereof while shaping the contact surface of the body with an open forming tool, and then inserting a relatively soft metal rivet in said cavity with the shank of the rivet projecting from the body of the tip, pressing the body of the tip about the portion of the rivet within the body while completing the shaping of the contact surface of the tip so as to leave the metal of the shank of the rivet in a relatively soft condition and the metal of the contact surface of the tip in a relatively hard condition, and finally severing the bodies of the contact tips from each other.

In witness whereof, I have hereunto set my hand this 6th day of September, 1928.

WALTER W. BROWN.